United States Patent
Feine (10) Patent No.: US 11,497,582 B2
(45) Date of Patent: Nov. 15, 2022

(54) UNIVERSAL PIEZO-MAGNETO ULTRASONIC SYSTEMS AND METHODS

(71) Applicant: James Feine, Bellaire, TX (US)

(72) Inventor: James Feine, Bellaire, TX (US)

( * ) Notice: Subject to any disclaimer, the term of this patent is extended or adjusted under 35 U.S.C. 154(b) by 0 days.

(21) Appl. No.: 15/164,678

(22) Filed: May 25, 2016

(65) Prior Publication Data

US 2016/0346061 A1 Dec. 1, 2016

Related U.S. Application Data

(60) Provisional application No. 62/166,107, filed on May 25, 2015.

(51) Int. Cl.
| | |
|---|---|
| *A61C 1/07* | (2006.01) |
| *A61C 1/00* | (2006.01) |
| *B06B 1/06* | (2006.01) |
| *B06B 1/08* | (2006.01) |
| *B06B 1/02* | (2006.01) |
| *A61C 17/20* | (2006.01) |

(52) U.S. Cl.
CPC ............. *A61C 1/07* (2013.01); *A61C 1/0023* (2013.01); *A61C 17/20* (2013.01); *B06B 1/0207* (2013.01); *B06B 1/06* (2013.01); *B06B 1/08* (2013.01); *B06B 2201/55* (2013.01); *B06B 2201/58* (2013.01); *B06B 2201/76* (2013.01)

(58) Field of Classification Search
CPC ......... A61C 1/07; A61C 1/0023; A61C 17/20; B06B 1/0207; B06B 1/06; B06B 1/08; B06B 2201/55; B06B 2201/58; B06B 2201/76

See application file for complete search history.

(56) References Cited

U.S. PATENT DOCUMENTS

| | | | | |
|---|---|---|---|---|
| 4,588,917 | A * | 5/1986 | Ratcliff | B06B 1/0253 310/26 |
| 5,730,594 | A * | 3/1998 | Sharp | A61C 17/20 433/119 |
| 6,164,968 | A | 12/2000 | Feine | |
| 6,503,081 | B1 | 1/2003 | Feine | |

(Continued)

OTHER PUBLICATIONS

Reynolds, "Efficiency and Effectiveness in Ultrasonic Scaling," Academy of Dental Therapeutics and Stomatology, [[https://www.]] dentalacademyofce.com/courses/1435/pdf/efficncy_effctvnss.pdf, accessed Feb. 25, 2019.

(Continued)

*Primary Examiner* — Chris L Rodriguez
*Assistant Examiner* — Drew S Folgmann
(74) *Attorney, Agent, or Firm* — Lundeen & Lundeen PLLC; Daniel N. Lundeen (57) ABSTRACT

An ultrasonic unit manufacturing system and process are based on a universal ultrasonic generator unit that operates interchangeably with either one of piezoelectric and magnetostrictive ultrasonic devices, and optionally as well as with either on-off or power level control footswitches. The ultrasonic units use a generator unit having a detector that determines whether the connected device is piezoelectric or magnetostrictive, and activates the generator for the appropriate piezoelectric or magnetostrictive operating mode. The ultrasonic units so made and methods of using them are also disclosed.

22 Claims, 6 Drawing Sheets

(56) References Cited

U.S. PATENT DOCUMENTS

| | | | |
|---|---|---|---|
| 6,893,261 B1 | 5/2005 | Feine | |
| 6,976,843 B2 | 12/2005 | Feine | |
| 7,150,629 B2 | 12/2006 | Feine | |
| 7,766,656 B1 | 7/2010 | Feine | |
| 8,204,612 B2 | 6/2012 | Feine | |
| 8,670,858 B2 | 3/2014 | Feine | |
| 9,157,898 B1* | 10/2015 | Steiner | G01S 15/04 |
| 9,551,995 B2 | 1/2017 | Feine | |
| 2007/0254261 A1* | 11/2007 | Rosenblood | A61C 1/0015 |
| | | | 433/98 |
| 2009/0148018 A1* | 6/2009 | Averkiou | A61B 8/0883 |
| | | | 382/131 |
| 2010/0036535 A1 | 2/2010 | Feine | |
| 2011/0250559 A1 | 10/2011 | Feine | |
| 2015/0289837 A1* | 10/2015 | Kim | A61B 8/4455 |
| | | | 600/454 |
| 2015/0320393 A1* | 11/2015 | Kim | A61B 8/546 |
| | | | 600/459 |

OTHER PUBLICATIONS

Sebero et al., "Magnetostrictive vs. Piezoelectric: Survey compares merits of ultrasonic scalers," RDM Magazine, vol. 36, No. 11, available at [[https://www.]] rdhmag.com/articles/print/volume-36/issue-11/contents/magnetostrictive-vs-piezoelectric.html, accessed Feb. 25, 2019.

\* cited by examiner

UNIVERSAL PIEZO-MAGNETO ULTRASONIC SYSTEMS AND METHODS

CROSS REFERENCE TO RELATED APPLICATIONS

This application is a nonprovisional and claims priority benefit of U.S. Ser. No. 62/166,107, filed May 25, 2015, which is hereby incorporated herein by reference in its entirety.

BACKGROUND

Currently, there are two types of ultrasonic dental systems widely available: magnetostrictive, sometimes simply referred to as "magneto", in which an alternating magnetic field is induced around a magnetostrictive stack at a resonant frequency to induce ultrasonic vibration; and piezoelectric, sometimes simply referred to as "piezo", in which an alternating electrical potential is applied to a stack of piezoelectric crystals to induce ultrasonic vibration. Practitioners generally prefer one system or the other, sometimes depending on the type of dental system being used and/or the type of operation being performed. Separate operating systems are used for the two different types of systems, each with its own generator or power supply, handpieces, inserts, etc. which are specific to the particular device and not interchangeable or useful with other devices or types of devices.

There are also two types of footswitches available for operating ultrasonic dental systems: on-off, wherein the system generator is equipped with a power level controller, e.g., a potentiometer, and the footswitch operates as an on-off controller; and a power level control footswitch, wherein the footswitch operates a potentiometer to adjust the power level to the ultrasonic tool. My earlier patent U.S. Pat. No. 6,976,843, which is hereby incorporated fully in its entirety by reference, discloses a system which can be used with either a power level control footswitch or an on-off footswitch.

Further, the power level control footswitch may be either of the "spring return" type, wherein removal of the operator's foot automatically returns the footswitch to the off position or to a lower power setting, or the "maintain" type, where the footswitch may be depressed to the desired setting (on or off, or a particular power level) and held there until released, e.g., by quickly fully depressing and then releasing the pedal of the footswitch.

The different types of operating units, as well as accessories, can complicate manufacturing since separate lines and facilities are needed for production of the different units. Also the variety of available units can require dental practitioners to keep, store, move, and maintain, different types of equipment that may need to be changed between procedures or between dental practitioners and/or patients. This generally requires additional office area, recordkeeping, expense, etc., compared to a single unit.

There is a need in general for improvements in ultrasonic dental equipment, and specifically for more interchangeability and adaptability between magnetostrictive and piezo ultrasonic medical and dental equipment as well as different types of footswitches. Further, there is a need to simplify manufacturing and operation of different types of ultrasonic dental equipment.

SUMMARY OF THE INVENTION

Disclosed herein is an ultrasonic system having a universal generator which is adapted to operate interchangeably with either one of piezoelectric and magnetostrictive ultrasonic devices, and optionally as well as with either on-off or power level control footswitches. Also disclosed is a system for the assembly or manufacture of the ultrasonic unit based on the universal generator, having an inventory of piezoelectric and/or magnetostrictive ultrasonic handpieces, and an assembly station wherein a handpiece from the inventory is attached to or packaged with one of the universal generators to complete the ultrasonic unit. A method comprising coupling either one of a piezoelectric or magnetostrictive ultrasonic device to a universal ultrasonic generator unit, and selectively activating an appropriate operating mode circuit of a drive signal conditioner in the universal generator, is also disclosed; as well as a method of assembling the ultrasonic unit which further comprises selecting for the coupling the ultrasonic handpiece from a piezoelectric and/or magnetostrictive handpiece inventory. In any embodiment, the universal generator may have an active detector to determine, preferably automatically, which type of handpiece is attached, and a relay to operate the generator in the appropriate piezoelectric or magnetostrictive mode.

In one aspect of the invention, an ultrasonic system comprises: an ultrasonic device selected from piezoelectric and magnetostrictive ultrasonic devices; a device cable to connect the ultrasonic device to a universal ultrasonic generator unit; a signal conditioner having both piezoelectric and magnetostrictive mode circuits to drive either one of the piezoelectric and magnetostrictive ultrasonic devices; and a switch to selectively activate the one of the piezoelectric and magnetostrictive mode circuits corresponding to the connected ultrasonic device.

In an embodiment, the invention provides an ultrasonic system comprising: an ultrasonic device selected from piezoelectric and magnetostrictive ultrasonic devices; and an ultrasonic device cable connecting the ultrasonic device to a universal ultrasonic generator unit; the generator unit comprising a drive signal conditioner having piezoelectric and magnetostrictive mode circuits to drive either of the piezoelectric and magnetostrictive ultrasonic devices, an automatic ultrasonic device detector that sends an interrogation signal to the connected ultrasonic device to determine if the connected ultrasonic device is piezoelectric or magnetostrictive, and a switch to selectively activate one of the piezoelectric and magnetostrictive operating mode circuits of the drive signal conditioner corresponding to the respective piezoelectric or magnetostrictive determination.

In another embodiment, an ultrasonic system comprises: an ultrasonic device selected from piezoelectric and magnetostrictive ultrasonic devices; a device cable to connect the ultrasonic device to a universal ultrasonic generator unit; a signal conditioner having both piezoelectric and magnetostrictive mode circuits to drive either one of the piezoelectric and magnetostrictive ultrasonic devices; a switch to selectively activate the one of the piezoelectric and magnetostrictive mode circuits corresponding to the connected ultrasonic device; an inventory comprising the piezoelectric ultrasonic devices, the magnetostrictive ultrasonic devices, or a combination thereof; an inventory of the device cables; an inventory of the universal ultrasonic generator units; and an assembly station to assemble together the device cables and the ultrasonic devices to the universal ultrasonic generator units to form complete ultrasonic units.

In one embodiment of the invention, an ultrasonic unit manufacturing system comprises: piezoelectric and/or magnetostrictive ultrasonic devices; ultrasonic device cables to connect the piezoelectric and magnetostrictive ultrasonic devices to universal ultrasonic generator units; each universal ultrasonic generator unit comprising a drive signal conditioner having piezoelectric and magnetostrictive operating mode circuits to drive one of the piezoelectric and magnetostrictive ultrasonic devices, respectively; and a switch to selectively activate one of the piezoelectric and magnetostrictive operating mode circuits. In an embodiment, the universal ultrasonic generator unit comprises an automatic ultrasonic device detector to determine if the connected ultrasonic device is piezoelectric or magnetostrictive, and a relay switch to selectively activate one of the piezoelectric and magnetostrictive operating mode circuits according to the determination.

In another aspect according to the present invention, an ultrasonic method comprises: connecting a power source to a universal ultrasonic generator unit having a signal conditioner having both piezoelectric and magnetostrictive mode circuits to drive either one of piezoelectric and magnetostrictive ultrasonic devices; connecting a cable between the universal ultrasonic generator unit and an ultrasonic device selected from the piezoelectric and magnetostrictive ultrasonic devices; and actuating a switch to selectively activate one of the piezoelectric and magnetostrictive operating mode circuits corresponding to the determination.

In a further aspect, an ultrasonic unit operating method comprises: connecting a power source to a universal ultrasonic generator unit comprising a drive signal conditioner and an active ultrasonic device detector, the drive signal conditioner comprising piezoelectric and magnetostrictive operating mode circuits; connecting an ultrasonic device, selected from one of a piezoelectric ultrasonic device and a magnetostrictive ultrasonic device, to the universal ultrasonic generator unit with an ultrasonic device cable; sending a detection signal from the interrogation signal generator to the connected ultrasonic device to determine if the connected ultrasonic device is piezoelectric or magnetostrictive; and selectively activating one of the piezoelectric and magnetostrictive operating modes corresponding to the respective determination.

In another aspect, an ultrasonic method comprises: selecting a universal ultrasonic generator unit from an inventory of universal ultrasonic generator units having a signal conditioner having both piezoelectric and magnetostrictive mode circuits to drive either one of piezoelectric and magnetostrictive ultrasonic devices; selecting an ultrasonic device from an inventory comprising piezoelectric ultrasonic devices, magnetostrictive ultrasonic devices, or a combination thereof; selecting a device cable from an inventory of the device cables; assembling together the selected ultrasonic device, the selected device cable, and the selected universal ultrasonic generator unit to form a complete ultrasonic unit; connecting the selected device cable between the selected universal ultrasonic generator unit and the selected ultrasonic device; and actuating a switch to selectively activate one of the piezoelectric and magnetostrictive operating mode circuits corresponding to the connected ultrasonic device.

In another aspect of the present invention, an ultrasonic unit manufacturing process comprises: providing a universal ultrasonic generator unit comprising a drive signal conditioner and an ultrasonic device detector, the drive signal conditioner comprising piezoelectric and magnetostrictive operating mode circuits; selecting an ultrasonic device from an inventory comprising piezoelectric and/or magnetostrictive ultrasonic devices; connecting the selected ultrasonic device to the universal ultrasonic generator unit; sending an interrogation signal to the ultrasonic device to determine if the connected ultrasonic device is piezoelectric or magnetostrictive; and selectively activating one of the piezoelectric and magnetostrictive operating mode circuits corresponding to the respective determination.

DETAILED DESCRIPTION

As used in the specification and claims, "near" and "proximate to" are inclusive of "at."

For purposes herein, the term "and/or" refers to both the inclusive "and" case and the exclusive "or" case, whereas the term "and or" refers to the inclusive "and" case only, and such terms are used herein for brevity. For example, a component comprising "A and/or B" may comprise A alone, B alone, or both A and B; and a component comprising "A and or B" may comprise A alone, or both A and B.

A magnetostrictive device refers to those ultrasonic devices understood by one of skill in the art to have an ultrasonic transducer, which typically comprise a plurality of elongated strips of magnetostrictive material, each strip having a proximal end and a distal end and are attached to its adjacent strip at the ends to form an integral substantially rigid column; and an ultrasonic resonant vibrator including such a transducer. Magnetostrictive dental devices typically operate at 25 or 30 kHz, although frequencies above or below this range may also be employed.

A piezoelectric device refers to those ultrasonic devices understood by one of skill in the art to have a plurality of piezo crystals arranged with a middle crystal as a first electrode and the end crystals as a second electrode; and an ultrasonic vibrator including such piezo crystals. Energizing of the crystals results in vibrations that travel through a piezo horn attached to the piezo crystals to the point or tip of a piezo scaler or other dental device. Piezoelectric oscillators used in dental scalers, e.g., typically have a series of quartz or other crystals with resonant frequency around 35 to 60 kHz. However, piezoelectric oscillators typically operate at a much higher voltage than required by a magnetostrictive ultrasonic transducer. The piezo insert for a particular handpiece/generator unit may be designed with a resonant frequency matching that of the magnetostrictive insert(s) in any ultrasonic device inventory.

The term magnetostrictive materials refer to those materials understood by one of skill in the art to be useful for converting magnetic energy into kinetic energy, or the reverse, as demonstrated by their use in building actuators and sensors. The property can be quantified by the magnetostrictive coefficient, L, which is the fractional change in length as the magnetization of the material increases from zero to the saturation value. The effect is responsible for the familiar "electric hum" which can be heard near transformers and high power electrical devices.

Examples of magnetostrictive materials for purposes herein include those having similar properties compared to cobalt, which exhibits the largest room temperature magnetostriction of a pure element at 60 microstrains. Other examples include alloys, including Terfenol-D, $Tb_xDy_{1-x}Fe_2$, and the like which exhibit about 2,000 microstrains in a field of 2 kOe (160 kA/m) at room temperature. Another very common magnetostrictive composite is the amorphous alloy $Fe_{81}Si_{3.5}B_{13.5}C_2$ with its trade name METGLAS 2605SC, and the like which has a high saturation magnetostriction constant, $\lambda$, of about 20 microstrains or more, coupled with a low magnetic anisotropy field strength, HA, of less than 1 kA/m (to reach magnetic saturation).

For purposes herein an ultrasonic device may be magnetostrictive, piezoelectric or the like, and is also referred to herein as an ultrasonic handpiece, or simply as a handpiece. Likewise, a drive signal for the handpiece refers to a power supply conditioned by a drive circuit to provide power in the appropriate form, including voltage, amperage, amplitude, frequency, etc. to operate the device ultrasonically. A generator unit may include, in addition to the power supply and drive circuit(s), the necessary hardware, connections, controls, displays, inputs, etc. to provide the drive signal and/or one or more fluids to the handpiece. Typical fluids include water, including various aqueous solutions, compressed air or other gases, and the like.

The term "universal" refers to one thing that can be used with a plurality of different associated other things, e.g., a universal remote can operate different entertainment systems, a universal voltage converter can convert power supplies of different voltage to a single voltage, and so on. As further examples, a universal generator can work with different types of ultrasonic devices, universal device or footswitch cables can connect a generator to different types of ultrasonic devices, to different footswitches, or the like.

The term "common" refers to a device, module or circuit which is shared between two or more operating modes, e.g., a common control module may operate to control the different circuits used to condition a drive signal for different ultrasonic devices, e.g., separately used piezo and magnetostrictive devices, or a common display module may display the operating parameters of two or more different circuits or devices, etc.

A "circuit" is a well-known electrical device that provides a path for electrical current to flow, and may include conductors, batteries, capacitors, resistors, switches, transistors, bulbs, diodes, induction coils, or like components.

As used herein a "switch" is a well-known electronic device that can selectively break or complete a circuit to interrupt the electrical current or divert it from one circuit to another, e.g., a toggle switch, rotary switch, biased switch, and so on. A "relay switch" is switch that is electrically actuated, such as, for example, electromagnetic relays, solid-state relays, analogue switches, and so on. Relay switches may also include one or more logic gates, e.g., resistor-transistor logic (RTL) devices; diode-transistor logic (DTL) devices; transistor-transistor logic (TTL) devices; field effect transistor (MOSFET) devices; fixed logic devices such as TTL 7400 series device (Texas Instruments) or CMOS 4000 series devices (RCA); programmable logic devices such as programmable logic array (PLA) devices, programmable array logic (PAL) devices, generic array logic (GAL) devices, complex programmable logic devices (CPLDs), field programmable gate array (FPGA) devices, and so on; etc. As used herein, relay switches also includes microprocessors, i.e., a computer processor incorporating the functions of a computer central processing unit into an integrated circuit.

As used herein, "active" refers to a device or process using functional components that change state internally in response to a stimulus, as opposed to a "passive" device or process in which a function is activated, altered, or deactivated by manipulation of fixed components.

A "signal" refers to an electromagnetic impulse or wave transmitted or received.

A "smart circuit" is an electrical circuit associated with programming so as to be capable of some independent action.

As used herein, a "signal conditioner" is an electrical device that converts one type of electronic signal into another type of signal, e.g., by changing the voltage, current, frequency, or other characteristic of a power supply to an output signal for operation of an electrical device with specific signal requirements.

A "drive signal" refers to a signal output to an electrical device to operate the device.

An "operating mode" refers to the operation of a signal conditioner to supply an output drive signal appropriate for a specific electrical device.

As used herein, a "unit" refers to an individual thing regarded as single and complete, but which can also form an individual component of a larger or more complex whole.

As used herein, a "footswitch" refers to a well-known device having a foot-depressible pedal and connected to an ultrasonic generator unit to control an operating characteristic of the connected ultrasonic device. Footswitches are well known to have various standard operating characteristics, e.g., the footswitch can be either an "on/off" footswitch wherein depressing and releasing the pedal switches the ultrasonic device on and off, or a "power level control" footswitch wherein the power supplied to the ultrasonic device is proportional to the extent of depression of the pedal through its stroke, and the power level control footswitch can also be either a "spring return" footswitch wherein the pedal automatically returns when the applied pressure is reduced, or a "maintain" footswitch wherein the pedal stays in its depressed position when the pressure is reduced and can usually be released by depressing the pedal to the end of its stroke to actuate a pedal release mechanism. Accordingly, any of the combinations of on/off, power level control/spring return, and power level control/maintain footswitches, are possible.

As used herein, "assemble together" means the collection of manufactured parts for a complete machine, structure, or unit of a machine. The parts needed for assembly can be collected, e.g., in a package such as a bag or box for later assembly, or all or some of the needed parts can be fitted together or attached as in a completely or partially assembled unit.

As used herein, "assembly" means the fitting together or attachment of manufactured parts into a complete machine, structure, or unit of a machine.

As used herein, an "assembly line" is a well-known series of workers and/or machines and/or other equipment in a factory by which a succession of identical items is progressively assembled.

As used herein, a "station" refers to a place or space where any machines and/or other equipment are located for a specified activity or service.

In one aspect according to the present invention, an ultrasonic system comprises: (1) an ultrasonic device selected from piezoelectric and magnetostrictive ultrasonic devices; (2) a device cable to connect the ultrasonic device to a universal ultrasonic generator unit; (3) a signal conditioner having both piezoelectric and magnetostrictive mode circuits to drive either one of the piezoelectric and magnetostrictive ultrasonic devices; and (4) a switch to selectively activate the one of the piezoelectric and magnetostrictive mode circuits corresponding to the connected ultrasonic device.

In one embodiment of the invention, the ultrasonic system further comprises a signal generation circuit to send an interrogation signal to the connected ultrasonic device; and the switch comprises a relay switch to automatically activate the piezoelectric or magnetostrictive mode circuit based on a response of the connected ultrasonic device to the interrogation signal. In an embodiment, the device cable is universal to connect to either one of the piezoelectric and magnetostrictive ultrasonic devices. In embodiments, the relay switch is selected from electromagnetic relays, solid-state relays, analogue switches, and combinations thereof, and so on. In embodiments, the relay switch comprises a logic gate, or a microprocessor.

In another embodiment, the ultrasonic system further comprises a footswitch selected from on/off and power level control footswitches, and a cable to connect the footswitch to the universal ultrasonic generator unit. Preferably the footswitch cable is universal to connect either one of the selected on/off or power level control footswitches to the universal ultrasonic generator units. In another embodiment, the ultrasonic system further comprises a footswitch detection circuit to determine whether the connected footswitch is the on/off footswitch or the power level control footswitch by sensing for a potentiometer in the footswitch; and a power level input to the drive signal conditioner selectively switched to either one of a front panel power level controller or the power level control footswitch based on the determination by the footswitch detection circuit. The potentiometer is seen in the power level control footswitch, which supplies the power level input; but when the footswitch is of the on/off type, the power level input can be input via a control on the generator unit, e.g., a knob or digital input.

In another embodiment, the footswitch cable connecting the footswitch to the universal ultrasonic generation unit, wherein the footswitch cable comprises a passive activation plug corresponding to the connected on/off or power level control footswitch.

In some embodiments, the universal ultrasonic generator unit further comprises a common control module to change operating characteristics of either one of the activated piezoelectric and magnetostrictive operating modes of the drive signal conditioner; and/or a common display module to display operating parameters of either one of the activated piezoelectric and magnetostrictive operating modes of the drive signal conditioner.

In another embodiment, e.g., for manufacturing, the ultrasonic system further comprises an inventory comprising the piezoelectric ultrasonic devices, the magnetostrictive ultrasonic devices, or a combination thereof; an inventory of the device cables; an inventory of the universal ultrasonic generator units; and an assembly station to assemble together the device cables and the ultrasonic devices to the universal ultrasonic generator units to form complete ultrasonic units. As one example, the ultrasonic system can further include packaging to receive the complete ultrasonic unit, e.g., one of the universal ultrasonic generator units, one of the piezoelectric and magnetostrictive ultrasonic devices, and one of the ultrasonic device cables, and if desired the device cable can be attached to the ultrasonic generator unit, the ultrasonic device, or both of the ultrasonic generator unit and the ultrasonic device.

In another embodiment, the ultrasonic system further comprises an inventory of footswitches selected from on/off footswitches and power level control footswitches, and or the complete ultrasonic units further comprise one of the footswitches.

In one embodiment of the invention, an ultrasonic method comprises: (1) connecting a power source to a universal ultrasonic generator unit having both piezoelectric and magnetostrictive mode circuits to drive either one of piezoelectric and magnetostrictive ultrasonic devices, e.g., a signal conditioner comprising both circuits; (2) connecting a cable between the universal ultrasonic generator unit and an ultrasonic device selected from the piezoelectric and magnetostrictive ultrasonic devices; and (3) actuating a switch to selectively activate one of the piezoelectric and magnetostrictive operating mode circuits corresponding to the connected ultrasonic device. In an embodiment, the method further comprises sensing for capacitance or induction in the connected ultrasonic device, and or automatically actuating the switch based on the sensed capacitance (piezoelectric) or inductance (magneto). Preferably, the device cable is universal to connect to either one of the piezoelectric and magnetostrictive ultrasonic devices.

In another embodiment, an ultrasonic method further comprises connecting a footswitch cable, preferably a universal cable, between the universal ultrasonic generator unit and a footswitch selected from on/off and power level control footswitches. The method can also include sensing for a potentiometer in the connected footswitch to determine if the footswitch is the on/off footswitch (no potentiometer) or the power level control footswitch (potentiometer); and or selectively switching a power level input to the drive signal conditioner from either one of a front panel power level controller (on/off footswitch) or the power level control footswitch (via the potentiometer) based on the sensing for the potentiometer.

In another embodiment, the ultrasonic method can also include changing operating characteristics of either one of the activated piezoelectric and magnetostrictive operating modes of the drive signal conditioner using a common control module for the operating mode circuits;

and/or displaying operating parameters of either one of the activated piezoelectric and magnetostrictive operating mode circuits of the drive signal conditioner on a common display module.

In an embodiment, e.g., for manufacturing, the ultrasonic method further comprises selecting the ultrasonic device for connection to the device cable from an inventory comprising the piezoelectric ultrasonic devices, the magnetostrictive ultrasonic devices, or preferably a combination thereof; selecting the device cable for connection to the selected ultrasonic device from an inventory of the device cables; selecting the universal ultrasonic generator unit for connection to the selected device cable from an inventory of the universal ultrasonic generator units; and assembling together the selected ultrasonic device, the selected device cable, and the selected universal ultrasonic generator unit, e.g., to form a complete ultrasonic unit. If desired, the complete ultrasonic unit can be packaged. In an embodiment, the assembling together comprises attaching the selected device cable to the selected ultrasonic generator unit, to the selected ultrasonic device, or to both of the selected ultrasonic generator unit and the selected ultrasonic device.

Additionally, the method can include selecting a footswitch from an inventory of footswitches comprising on/off footswitches, power level control footswitches, or a combination thereof, and or assembling together the selected footswitch, the selected ultrasonic device, the selected device cable, and the selected universal ultrasonic generator unit to form the complete ultrasonic unit.

Figure 1:
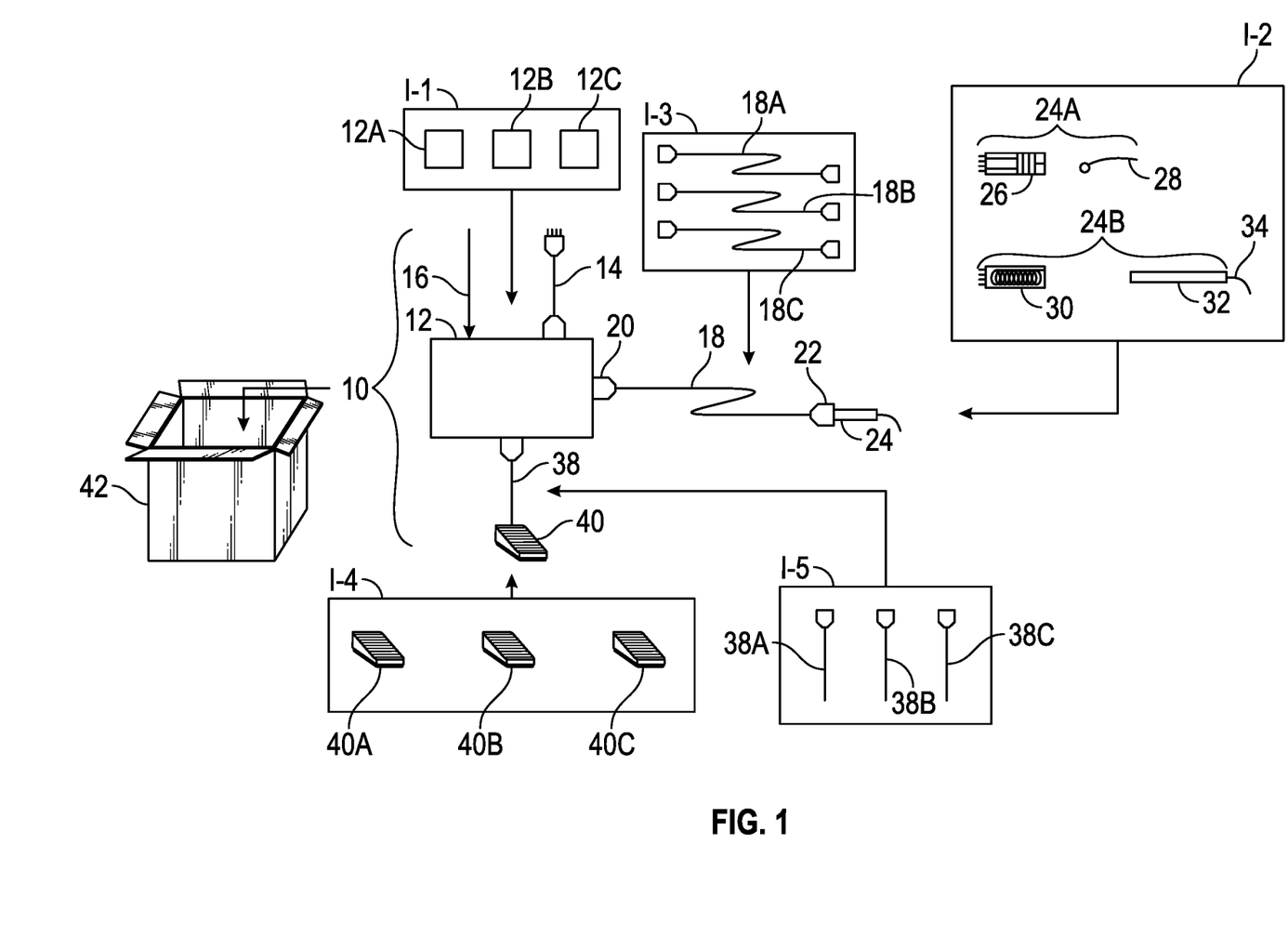
FIG. 1 is a schematic diagram showing an ultrasonic unit and associated manufacturing inventories according to embodiments of the instant disclosure.

Turning to FIG. 1, a complete ultrasonic system or unit 10 generally comprises a generator unit 12, which can be connected to a power line 14 such as a plug-in electric cord to supply power, and optionally to a fluid supply line 16 to supply water or another fluid which may be connected to the generator unit 12 via conventional plumbing fittings. In manufacturing or assembly, the generator 12 can be selected from an inventory I-1 comprising generator units 12A, 12B, 12C, etc., which are identical universal generator units that form the basis of an assembly-line type of manufacturing since it can drive any handpiece 24 and or any type of footswitch 40 that may be present in the assembly line (see FIGS. 5 and 6).

In an embodiment the ultrasonic unit 10 includes a cable 18 which may have plug-in connectors 20, 22 at respective ends for connection to the generator unit 12 and the ultrasonic device 24. In manufacturing or assembly or use, the ultrasonic device 24 can be selected from an inventory I-2 comprising one or more of either or both of piezoelectric ultrasonic device 24A and magnetostrictive ultrasonic device 24B. As is well known to the skilled person, the piezoelectric ultrasonic device 24A comprises a piezoelectric handpiece 26 and a usually replaceable, screw-in tip 28; whereas magnetostrictive device 24B has a magnetostrictive handpiece 30 removably receiving a magnetostrictive insert 32 and carrying tip 34, which is preferably also replaceable. Similarly, in manufacturing or assembly, the cable 18 can be selected from an inventory I-3 comprising cables 18A, 18B, 18C, etc., which are preferably universal to connect to any type of ultrasonic device 24 that may be present in the assembly line.

The generator unit 12 may optionally be connected via cable 38 to footswitch 40, which during manufacture or assembly or use can be selected from an inventory I-3 comprising one or preferably more of footswitch types 40A, 40B, 40C. In this example, the footswitch 40A may have on-off functionality, the footswitch 40B may have power level control functionality with a spring return action, and the footswitch 40C may have power level control functionality with a maintain action, etc. Footswitches 40A, 40B, 40C may be for example, one of the footswitches or variations thereof described in U.S. Pat. No. 6,976,843. Similarly, in manufacturing or assembly, the cable 38 can be selected from an inventory I-4 comprising cables 38A, 38B, 38C, etc., which are preferably universal to connect to any type of footswitch 40 that may be present in the assembly line.

In some embodiments, the completely or partially assembled unit 10 with one or more components remaining to be assembled for use therewith can be placed in packaging 42 for storage and/or shipment. Components requiring assembly or connection may include for example, ultrasonic device 24 and/or cable 18, which may be placed in packaging 42 attached to both or one or neither of the device 24 and unit 12, and/or footswitch 40 and/or cable 18, which may be attached to both or one or neither of the footswitch 40 and unit 12.

In an embodiment, the ultrasonic device 24 may be a dental scaler, a high speed rotary machine, a low speed rotary machine, or the like, as are typically found in a dental practitioner's office.

Figure 2A:
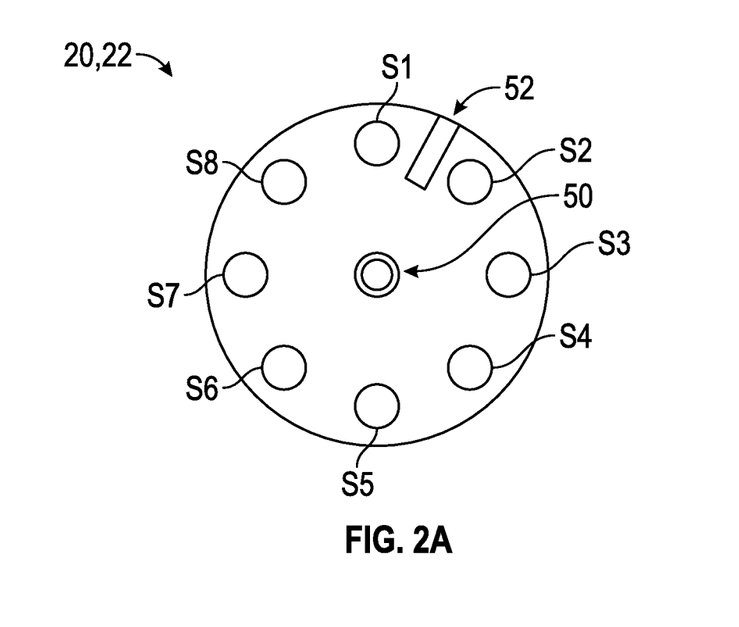
FIG. 2A is an end view of a handpiece connector according to an embodiment of the instant disclosure.

FIG. 2A shows an end view of one or both of the connectors 20, 22 having a fluid port 50, a locator notch 52 to align with a corresponding tab on the connecting connector or end of the respective generator unit 12 and ultrasonic device 24, and a plurality of sockets S1-S8. The fluid port 50 opens from a fluid conduit traveling through the length of the preferably universal cable 18 to the generator unit 12 to supply the fluid stream to the ultrasonic device 24. Similarly wires or circuits connected to the sockets S1-S8 pass though the cable 18 to transmit the drive signal(s) from the generator unit 12 to the ultrasonic device 24 or 26.

In some embodiments, specific combinations of the sockets S1-S8 may receive respective pins from the selected ultrasonic device, depending on the type, e.g., sockets S1, S2, S3, S4 may be designated for magnetostrictive devices, while sockets S5, S6, S7, S8 may be designated for piezo devices. In other embodiments, especially where the type of ultrasonic device is automatically determined, some or all of the sockets S1-S8 can be used with both piezo and magneto devices. As one example of this, two or three of the sockets S1-S8 can be used to transmit an interrogating signal to the device 24 or otherwise to sense the type of device that is connected.

Figure 2B:
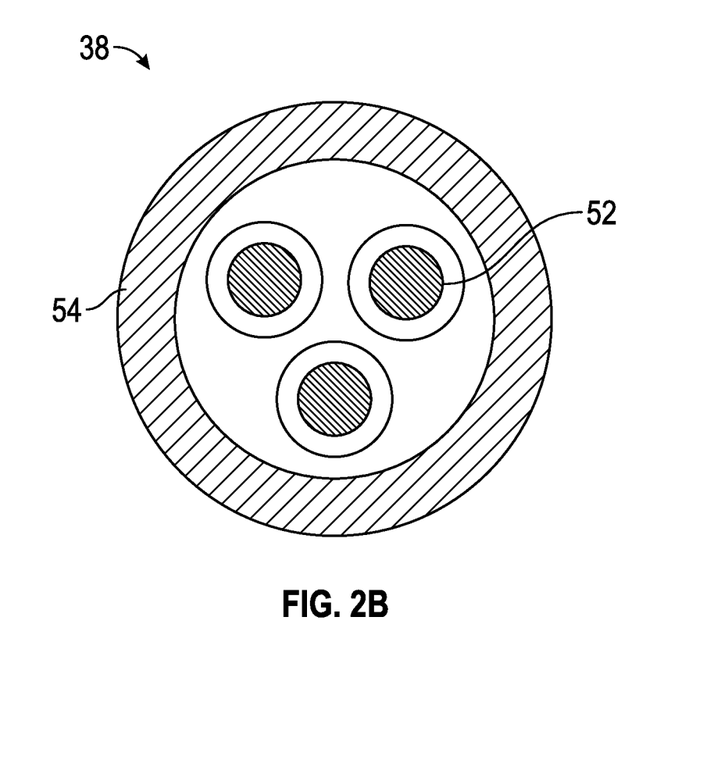
FIG. 2B is an end view of the footswitch cable according to embodiments of the instant disclosure.

FIG. 2B shows a section of the footswitch cable 38, which may have a number of insulated electrical connectors 52 as needed within a sheath 54, as is well known in the art. The cable 38 can preferably be a universal cable to connect to both on/off and power level control footswitches, or the cable 38 can employ passive footswitch type selection functionality as disclosed in FIGS. 6A and 6B of U.S. Pat. No. 6,976,843, which is hereby incorporated by reference in its entirety.

Figure 3:
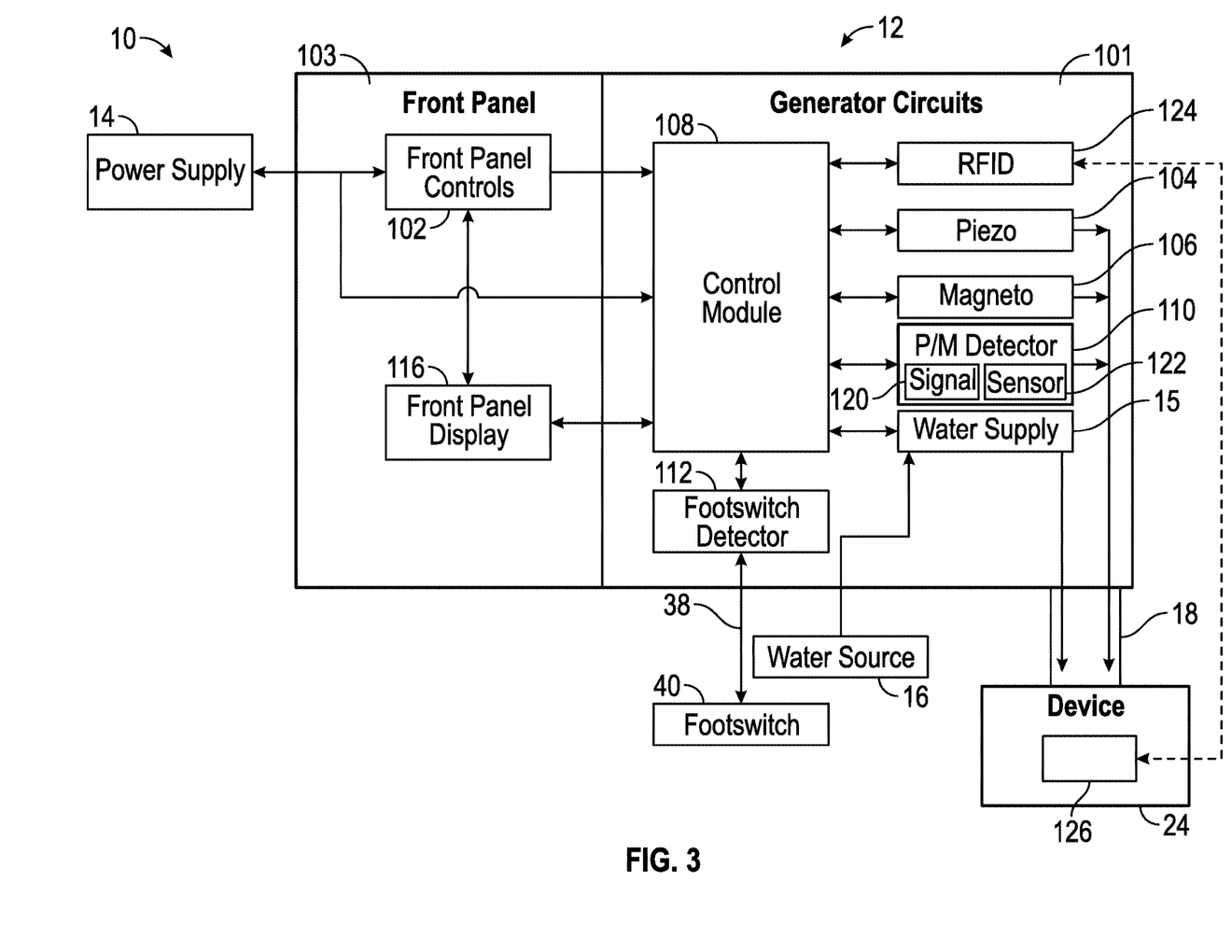
FIG. 3 is a schematic circuit diagram for an ultrasonic unit according to an embodiment of the instant disclosure.

FIG. 3 is a schematic diagram for ultrasonic unit 10 according to an embodiment of the instant disclosure. The power supply 14 supplies power to the generator circuits 100 within the chassis 101 of the generator unit 12, as well as to front panel controls 102 located on the front panel 103 of the unit 12. The power may be optionally turned on or shut off by a switch, for example, in the front panel controls 102, which may also include knobs, switches, digital inputs, or the like, to control the power level, operating frequency, off side tuning, air or water flow rate and/or temperature, or other operator input functions.

The generator unit 12 may include a piezo circuit 104 for operating in a piezoelectric mode, a magnetostrictive circuit 106 for operating in a magnetostrictive mode, a common control module 108, a piezo-magnetostrictive detector 110, a footswitch detector 112, or the like. The unit 12 can also have a water supply controller 15 consisting of flow lines, flow controllers, pressure regulators, or the like, which receives water from source 16 and supplies it to the connected device 24 via the cable 18. If the water source 16 is not reliably pressurized, or otherwise as desired, the supply unit 15 may include a pump.

The control module 108 may receive inputs from the front panel controls 102, as well as footswitch 40. The control module 108 may provide information to the common display module 116, which may be mounted on a front panel 103 of the generator unit 12 near or with the front panel controls 102.

The piezo-magnetostrictive detector 110 may detect the type of ultrasonic device 24 attached to the cable 18 via a signal received from the cable 18. For example, piezoelectric devices normally operate primarily on a principle of capacitance, whereas magnetostrictive devices normally operate on a principle of inductance. Thus, the type of device can be determined, preferably automatically when the unit 12 is powered up and/or the device 24 attached, by inducing an electrical potential or current to the device as an interrogating signal from signal generator 120, and sensing at sensor 122 for a relatively high current characteristic of induction in a magneto device, or for an increase in potential and declining current characteristic of capacitance in a piezo device.

In an alternative embodiment, the operating mode of the generator unit 12 may be selected by connecting the ultrasonic device 24 with a cable 18 employing passive device type selection functionality as disclosed in U.S. Pat. No. 6,976,843, which is hereby incorporated by reference in its entirety. See FIG. 2A above, e.g., where such passive switching technology can be embodied in the plug 20, 22 configurations where certain sockets may be designated for a piezo device 24A and not used in a magneto device, and vice versa, other sockets may be designated for a magnetostrictive device 24B.

In some embodiments, the unit 12 may contain an RFID reader 124 to receive a radio or other wavelength signal from an RFID 126 in or on the ultrasonic device 24. As described in U.S. Patent publication US 2010/0036535, incorporated by reference herein, the ultrasonic device 24 may comprise bidirectional communication circuitry to provide electronic communication with the ultrasonic generator unit, for example, via the cable 18 and/or RFID 126 and reader 124, to control an operating characteristic such that the ultrasonic device 24 provides some or all of the control functions and cooperates with any common control module functionality to further enhance operation of the device 24.

Similarly, footswitch detector 112 may sense, preferably automatically at power up or upon connection of the footswitch 40, whether there is electrical resistance in the footswitch 40 indicative of a potentiometer used for a power level control function, or no resistance, indicative of on/off functionality. Likewise, spring maintain or return functionality can be determined, if needed, by sensing for rapid change of the footswitch position to a maximum power level and then to the minimum, indicative of a maintain functionality, or for an immediate reduction in power level without the brief increase indicative of spring return functionality. The control module 108 can be operationally modified accordingly to a corresponding mode for the appropriate type of footswitch 40 that is detected.

In another embodiment, the footswitch 40 may be connected to the generator unit 12 with a cable 38 employing passive footswitch type selection functionality as disclosed in FIGS. 6A and 6B of U.S. Pat. No. 6,976,843, which is hereby incorporated by reference in its entirety.

A magnetostrictive ultrasonic power scaler can thus be adapted or retrofit to power a piezo insert, based on microprocessor technology in one embodiment, and provide advanced features such as comfort and ease of a manual tuned unit, utilization of any operating frequency, automatic water control, RFID technology, or any combination thereof. For example, the unit 10 can use one or more features from U.S. Pat. Nos. 6,503,081 6,976,843; 7,150,629; or the like, each of which is incorporated herein by reference in its entirety.

In an embodiment, the ultrasonic device 24 is a dental scaler which receives water and/or compressed air via the cable 18 to provide cooling and facilitate debris removal from the dental working surfaces being cleaned. The ultrasonic devices 24A, 24B suitable for use herein are readily available and known in the art. In one embodiment, the unit 10 is based on a power generating unit 12 and handpiece 24B available from Ultrasonic Services, Inc. under the trade designation USI 25MPLC (Ultrasonic Services, Inc., Houston, Tex.) using power supply units with power level control and/or footswitch technology commercially available under the trade designations USI 25 PLC, USI 30 PLC (Ultrasonic Services, Inc., Houston, Tex.) and/or the like and/or operating characteristic control technology, and/or RFID detection enablement, or one of the power generators as disclosed in U.S. Pat. Nos. 6,164,968; 6,503,081; 6,893,261; 6,893,261; 6,976,843; 7,150,629; US 2010/0036535; or the like, each of which is fully and completely incorporated herein by reference in its entirety, suitably modified for dual piezo/magnetostrictive circuitry with common control module, common display module and common cabling.

Figure 4:
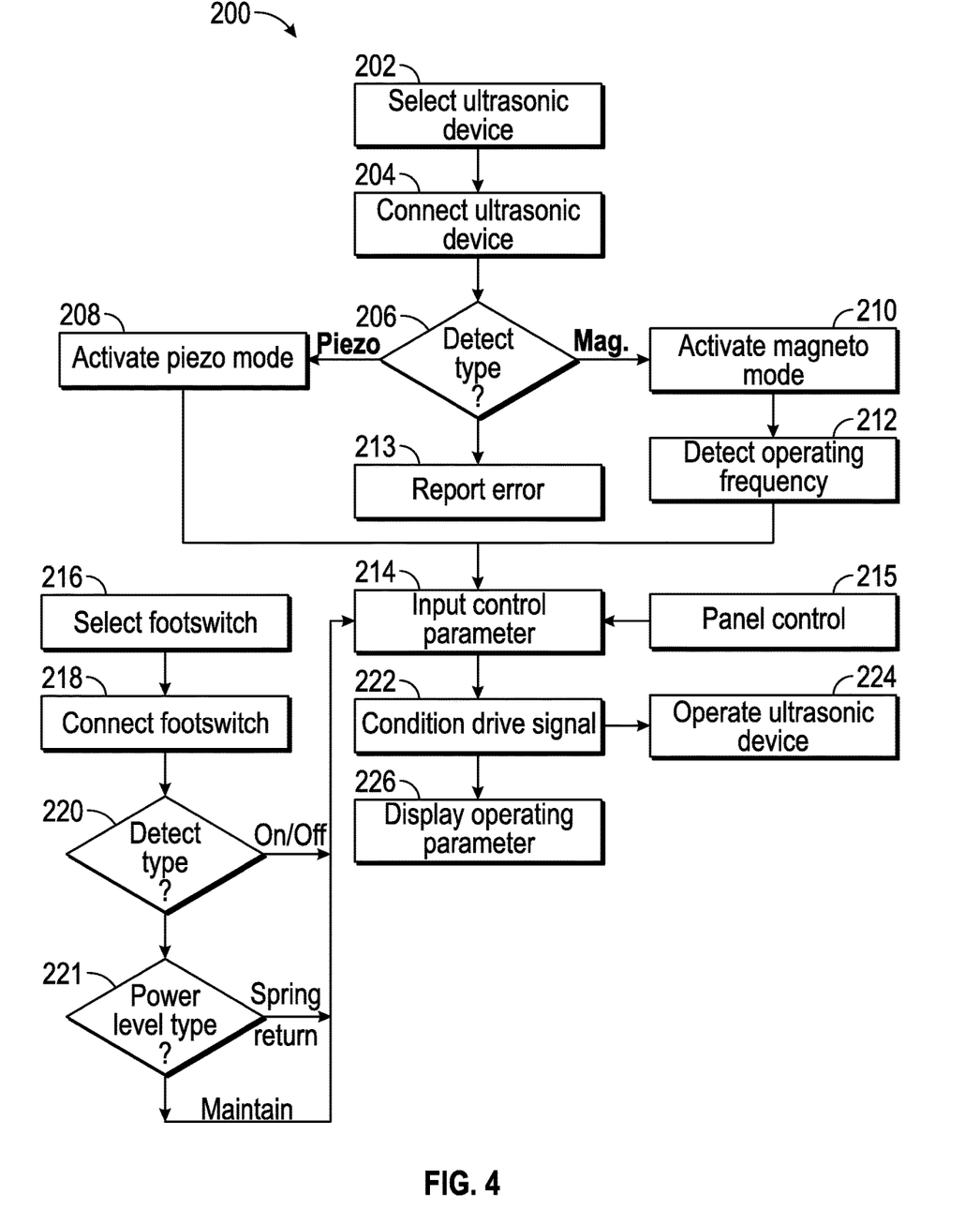
FIG. 4 is a schematic flow diagram for operation of an ultrasonic system according to an embodiment of the instant disclosure.

FIG. 4 is a schematic block flow diagram of a method 200 for operation of the ultrasonic system of FIGS. 1-3, according to an embodiment of the instant disclosure. In this method, if an inventory of ultrasonic devices is available, a desired ultrasonic device 24 is selected in step 202, and connected to the cable 18 and unit 12 in step 204. Alternatively, the device 24 and/or cable 18 may be dedicated and/or permanently connected at the factory, in which case steps 202 and/or 204 may be optional for the dental practitioner or other operator of the unit 10. Alternatively, the practitioner may have an inventory of different ultrasonic devices from which to choose for connection, since any will work with the generator 12.

Then, if equipped, the system detects the type of ultrasonic device 24 in step 206 via detector 110 (FIG. 3), and activates the appropriate piezo circuit 104 or magnetostrictive circuit 106 (see FIG. 3) in respective alternate path steps 208, 210. A further step of detecting an operating characteristic of the detected device may optionally be executed, e.g., if a magnetostrictive device is detected, step 212 may further detect an operating characteristic such as resonant frequency of the device.

If the device 24 is not properly connected, if there is a device malfunction, or if the type of device is indeterminate, an error message may be reported on the panel display 116 in step 213. Alternatively, the mode circuit may default to either magneto or piezo operation, unless the other type of device 24 is detected. In this embodiment, the detection step 206 and switching may be simplified and only require sensing for the non-default device type, rather than from testing for both magneto and piezo.

The detection function 206 can be continuous, intermittent, and/or periodic, throughout operation of the device 24, or if desired, it can be used only on power up and/or upon connection of the device to the unit 12. In an alternative or additional embodiment, the function 206 may be set manually using an operator-activated switch.

In step 214, the operator may input one or more control parameters such as an on-off state, a power level, tuning adjustments, fluid flow rate, and so on, using front panel controls in step 215, or an external or remote input device such as a distributed microprocessor control, footswitch or the like. If a footswitch 40 is employed, an appropriate one may be selected from any available inventory in step 216 and connected to the generator unit in step 218, or alternatively the footswitch 40 and/or cable 38 may be dedicated and/or permanently connected at the factory, in which case steps 216 and/or 218 are optional for the dental practitioner or other operator of the unit 10 with no alternative footswitch 40 inventory. If desired, operation 220 may implement automatic footswitch type detection, e.g., on-off or power level control, and if power level control, operation 221 can further determine (if such data collection is needed or desired) whether the footswitch 40 is spring return type, maintain type, or the like. Generally, a determination of footswitch 40 being of the on/off type allow or require the power level to be input manually in step 215.

Then, in operation 222, the activated piezo or magneto circuit conditions the drive signal for operation of the connected ultrasonic device 24 according to the input parameters from step 214, and the ultrasonic device receives the drive signal in step 224 for operation of the device. Operation 226 is the display of the operating parameters in the common display module, e.g., the panel display, a remote PC display, or the like.

Figure 5:
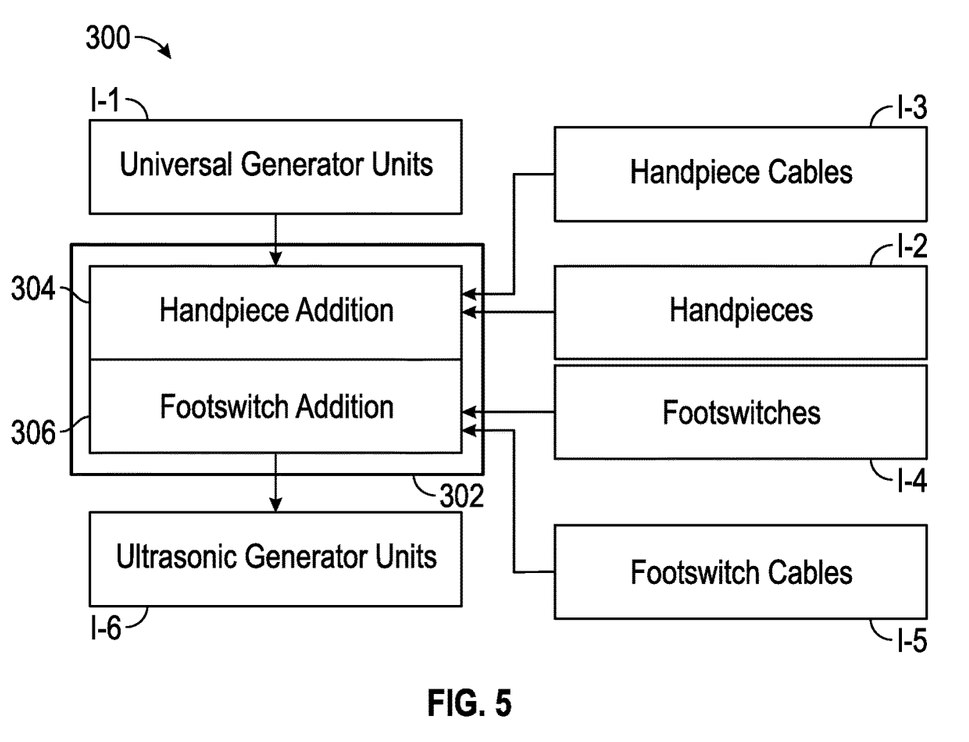
FIG. 5 is a schematic diagram of an ultrasonic unit assembly system according to some embodiments of the invention.

FIG. 5 is a schematic diagram of an ultrasonic system 300 according to some embodiments of the invention, e.g., in manufacturing using an assembly line, or in a dental practitioner's office where the practitioner may use different units, handpieces and/or footswitches, and/or the corresponding cables. An inventory I-1 of the universal generator units 12 (see FIG. 1) provides a basis for assembly line manufacturing of the units 10, as mentioned above. The universal generator inventory I-1 can be populated by making the generator units 12 at an appropriate assembly station. The generator units 12 are then supplied to assembly station 302 comprising handpiece connection station 304 and footswitch connection station 306, which may be arranged in any order.

The ultrasonic devices 24 can be made at an appropriate handpiece assembly station to populate the inventory I-2, and the cables 18 at a respective assembly station to populate the inventory I-3. The cables 18 and devices 24 are then supplied to the handpiece connection station 304 as needed.

The footswitches 40 can be made at an appropriate footswitch assembly station to populate the inventory I-4, and the cables 38 at a respective assembly station to populate the inventory I-5. The cables 38 and footswitches 40 are then supplied to the footswitch connection station 306 as needed. Completely and/or partially assembled ultrasonic units 10 may then be packaged and populate inventory I-6 and/or be shipped to a purchaser or distributor.

For the dental practitioner, the system 300 only uses the available ones of alternative inventory I-1 (e.g., spare unit), I-2 (different devices), I-3 (different or spare cables), I-4 (different footswitches), and/or I-5 (different or spare cables), and the assembly station 302 may be located in the office.

Figure 6:
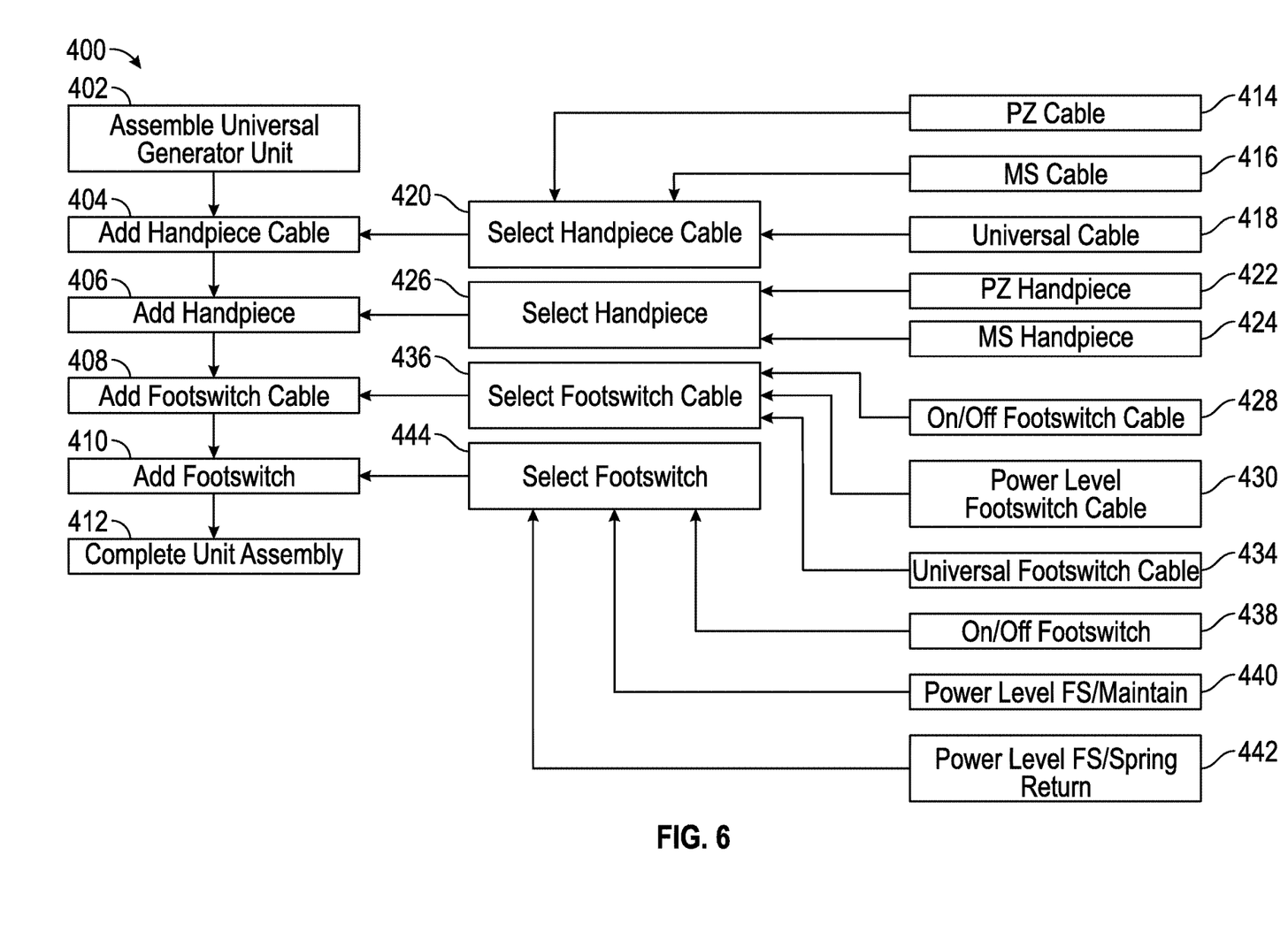
FIG. 6 is a schematic flow diagram of an ultrasonic unit assembly process according to some embodiments of the invention.

FIG. 6 is a schematic flow diagram of an ultrasonic unit assembly process 400 according to some embodiments of the invention. The universal generator units 12 are assembled in step 402, handpiece cables 18 added (attached or collected in a container or package) in step 404, devices 24 added (attached or collected in a container or package) in step 406, footswitch cable added (attached or collected in a container or package) in step 408, footswitches 40 added (attached or collected in a container or package) in step 410, and complete units 10 are finished, e.g., quality control checked, packaged, etc., in step 412. Steps 402, 404, 406, 408, 410, and 412 may be completed in any order or mix of orders, noting that at least some parts of step 402 are usually completed first, and at least some parts of step 412 may be completed last.

As desired, piezoelectric cables 18A, magnetostrictive cables 18B, and/or universal cables 18C, are assembled in steps 414, 416, and 418, respectively. The desired cable 18 for a particular unit 10 is then selected in step 420 for use in cable attachment step 404.

As desired, piezoelectric devices 24A and/or magnetostrictive devices 24B are assembled in steps 422 and 424, respectively. The desired ultrasonic device 24 for a particular unit 10 is then selected in step 426 for use in handpiece attachment step 406.

As desired, on/off footswitch cable 38A, power level control footswitch cable 38B, and/or universal footswitch cable 38C are assembled in steps 428, 430, and 434, respectively. The footswitch cable 38 for a particular unit 10 is then selected in step 436 for use in footswitch cable attachment step 408.

As desired, on/off footswitch 40A, power level control footswitch 40B with maintain action, and/or power level control footswitch 40C with spring return action, are assembled in steps 438, 440, 442, respectively. The footswitch 40 for a particular unit 10 is then selected in step 444 for use in footswitch attachment step 410.

Embodiments Listing

Accordingly, the present invention provides the following Embodiments:

S1. An ultrasonic system, comprising:
- an ultrasonic device selected from piezoelectric and magnetostrictive ultrasonic devices;
- a device cable to connect the ultrasonic device to a universal ultrasonic generator unit;
- a signal conditioner having both piezoelectric and magnetostrictive mode circuits to drive either one of the piezoelectric and magnetostrictive ultrasonic devices; and
- a switch to selectively activate the one of the piezoelectric and magnetostrictive mode circuits corresponding to the connected ultrasonic device.

S2. The ultrasonic system of Embodiment S1, further comprising:
- a signal generation circuit to send an interrogation signal to the connected ultrasonic device;
- wherein the switch comprises a relay switch for automatic selective activation of the piezoelectric or magnetostrictive mode circuit based on a response of the connected ultrasonic device to the interrogation signal.

S3. The ultrasonic system of Embodiment S1 or Embodiment S2, wherein the device cable is universal to connect to either one of the piezoelectric and magnetostrictive ultrasonic devices.

S4. The ultrasonic system of Embodiment S2, wherein the relay switch comprises a microprocessor.

S5. The ultrasonic system of Embodiment S2, wherein the relay switch comprises a logic gate.

S6. The ultrasonic system of Embodiment S2, wherein the relay switch is selected from electromagnetic relays, solid-state relays, analogue switches, and a combination thereof.

S7. The ultrasonic system of any one of Embodiments S1 to S6, further comprising:
- a footswitch selected from on/off and power level control footswitches; and
- a universal footswitch cable to connect either one of the selected on/off or power level control footswitches to the universal ultrasonic generator units.

S8. The ultrasonic system of Embodiment S7, further comprising:

a footswitch detection circuit to determine whether the connected footswitch is the on/off footswitch or the power level control footswitch by sensing for a potentiometer in the footswitch; and a power level input to the drive signal conditioner selectively switched to either one of a front panel power level controller or the power level control footswitch based on the determination by the footswitch detection circuit.

S9. The ultrasonic system of any one of Embodiments S1 to S6, further comprising:

a footswitch selected from on/off or power level control footswitches; and a footswitch cable connecting the footswitch to the universal ultrasonic generation unit, wherein the footswitch cable comprises a passive activation plug corresponding to the connected on/off or power level control footswitch.

S10. The ultrasonic system of any one of Embodiments S1 to S9, wherein the universal ultrasonic generator unit further comprises:

a common control module to change operating characteristics of either one of the activated piezoelectric and magnetostrictive operating modes of the drive signal conditioner;

a common display module to display operating parameters of either one of the activated piezoelectric and magnetostrictive operating modes of the drive signal conditioner; or a combination thereof.

S11. The ultrasonic system of any one of Embodiments S1 to S10, further comprising:

an inventory comprising the piezoelectric ultrasonic devices, the magnetostrictive ultrasonic devices, or a combination thereof;

an inventory of the device cables;

an inventory of the universal ultrasonic generator units; and an assembly station to assemble together the device cables and the ultrasonic devices to the universal ultrasonic generator units to form complete ultrasonic units.

S12. The ultrasonic system of Embodiment S11, further comprising packaging to receive the complete ultrasonic unit comprising one of the universal ultrasonic generator units, one of the piezoelectric and magnetostrictive ultrasonic devices, and one of the ultrasonic device cables.

S13. The ultrasonic system of Embodiment S11 or Embodiment S12, wherein the complete ultrasonic units comprise the device cable attached to the ultrasonic generator unit, the ultrasonic device, or both of the ultrasonic generator unit and the ultrasonic device.

S14. The ultrasonic system of any one of Embodiments S11 to S13, further comprising an inventory of footswitches selected from on/off footswitches and power level control footswitches, wherein the complete ultrasonic units further comprise one of the footswitches.

S15. The ultrasonic system of any one of Embodiment S1 to Embodiment S14, wherein the device cable comprises:

conductors to transmit electrical signals between the universal ultrasonic generator unit and the connected ultrasonic device; and a flow passage to transmit fluid from the universal ultrasonic generator unit to the connected ultrasonic device.

S16. The ultrasonic system of any one of Embodiment S1 to Embodiment S15, wherein the signal conditioner further comprises a tuning circuit to modulate the magnetostrictive mode circuit to drive the connected magnetostrictive ultrasonic device at a resonant frequency or an off-side resonant frequency of the ultrasonic device.

M1. An ultrasonic method, comprising:

connecting a power source to a universal ultrasonic generator unit having a signal conditioner having both piezoelectric and magnetostrictive mode circuits to drive either one of piezoelectric and magnetostrictive ultrasonic devices;

connecting a device cable between the universal ultrasonic generator unit and an ultrasonic device selected from the piezoelectric and magnetostrictive ultrasonic devices; and actuating a switch to selectively activate one of the piezoelectric and magnetostrictive operating modes corresponding to the determination.

M2. The ultrasonic method of Embodiment M1, further comprising:

sensing for capacitance or induction in the connected ultrasonic device wherein the actuation of the switch is automatic based on a response of the connected ultrasonic device to the interrogation signal.

M3. The ultrasonic method of Embodiment M1 or Embodiment M2, wherein the device cable is universal to connect to either one of the piezoelectric and magnetostrictive ultrasonic devices.

M4. The ultrasonic method of any one of Embodiment M1 to Embodiment M3, further comprising connecting a universal footswitch cable between the universal ultrasonic generator unit and a footswitch selected from on/off and power level control footswitches.

M5. The ultrasonic method of Embodiment M5, further comprising:

sensing for a potentiometer in the connected footswitch to determine if the footswitch is the on/off footswitch or the power level control footswitch; and selectively switching a power level input to the drive signal conditioner from either one of a front panel power level controller or the power level control footswitch, based on the determination of the potentiometer sensing.

M6. The ultrasonic method of any one of Embodiment M1 to Embodiment M5, further comprising:

changing operating characteristics of either one of the activated piezoelectric and magnetostrictive operating modes of the drive signal conditioner using a common control module for the operating modes;

displaying operating parameters of either one of the activated piezoelectric and magnetostrictive operating modes of the drive signal conditioner on a common display module; or a combination thereof.

M7. The ultrasonic method of any one of Embodiments M1 to Embodiment M6, further comprising:

selecting the ultrasonic device for connection to the device cable from an inventory comprising the piezoelectric ultrasonic devices, the magnetostrictive ultrasonic devices, or a combination thereof;

selecting the device cable for connection to the selected ultrasonic device from an inventory of the device cables;

selecting the universal ultrasonic generator unit for connection to the selected device cable from an inventory of the universal ultrasonic generator units; and assembling together the selected ultrasonic device, the selected device cable, and the selected universal ultrasonic generator unit to form a complete ultrasonic unit.

M8. The ultrasonic method of Embodiment M7, further comprising packaging the complete ultrasonic unit.

M9. The ultrasonic method of Embodiment M7 or Embodiment M8, wherein the assembling together comprises attaching the selected device cable to the selected ultrasonic generator unit, the selected ultrasonic device, or to both of the selected ultrasonic generator unit and the selected ultrasonic device.

M10. The ultrasonic method of any one of Embodiment M7 to Embodiment M9, further comprising selecting a footswitch from an inventory of footswitches comprising on/off footswitches, power level control footswitches, or a combination thereof, and assembling together the selected footswitch, the selected ultrasonic device, the selected device cable, and the selected universal ultrasonic generator unit to form the complete ultrasonic unit.

M11. The ultrasonic method of any one of Embodiment M1 to Embodiment M10, further comprising:
transmitting electrical signals through the device cable between the universal ultrasonic generator unit and the connected ultrasonic device; and
transmitting fluid flow through a flow passage tin the device cable from the universal ultrasonic generator unit to the connected ultrasonic device.

M12. The ultrasonic method of any one of Embodiment M1 to Embodiment M11, wherein the magnetostrictive ultrasonic device is connected, and further comprising:
detecting an operating frequency of the connected magnetostrictive ultrasonic device;
optionally adjusting the detected operating frequency for off side tuning; and
modulating the magnetostrictive mode circuit to drive the connected magnetostrictive ultrasonic device at the operating frequency or the adjusted operating frequency.

While the invention has been illustrated and described in detail in the drawings and foregoing description, the same is to be considered as illustrative and not restrictive in character, it being understood that only some embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An ultrasonic dental scaling system, comprising:
an ultrasonic device comprising a power scaler handpiece and a tip, wherein the ultrasonic device is selected from a piezoelectric ultrasonic device operable on capacitance and a magnetostrictive ultrasonic device operable on inductance;
a device cable connecting the ultrasonic device to a signal conditioner of a universal ultrasonic generator unit;
the signal conditioner comprising a piezoelectric mode circuit to drive the piezoelectric ultrasonic device when connected to the universal ultrasonic generator and further comprising a magnetostrictive mode circuit to drive the magnetostrictive ultrasonic device when connected to the universal ultrasonic generator; and
the signal conditioner further comprising a switch to selectively activate the piezoelectric mode circuit and de-activate the magnetostrictive mode circuit when the piezoelectric ultrasonic device is connected, and activate the magnetostrictive mode circuit and de-activate the piezoelectric mode circuit when the magnetostrictive ultrasonic device is connected; and
a signal generation circuit to send an interrogation signal to the connected ultrasonic device and detect a response;
wherein the switch comprises a relay switch to automatically activate the piezoelectric or magnetostrictive mode circuit and de-activate the other of the magnetostrictive or piezoelectric mode circuit based on the response of the connected ultrasonic device to the interrogation signal.

2. The ultrasonic dental scaling system of claim 1, wherein the device cable is universal to connect to either one of the piezoelectric and magnetostrictive ultrasonic devices.

3. The ultrasonic dental scaling system of claim 1, wherein the relay switch is selected from electromagnetic relays, solid-state relays, analogue switches, or a combination thereof.

4. The ultrasonic dental scaling system of claim 1, wherein the relay switch comprises a logic gate.

5. The ultrasonic dental scaling system of claim 1, wherein the relay switch comprises a microprocessor.

6. The ultrasonic dental scaling system of claim 1, further comprising:
a footswitch selected from the group consisting of an on/off footswitch and a power level control footswitch; and
a footswitch cable to interchangeably connect either one of the selected on/off or power level control footswitches to the signal conditioner of the universal ultrasonic generator unit.

7. The ultrasonic dental scaling system of claim 6, further comprising:
wherein the power level control footswitch, if present, comprises a potentiometer;
wherein the signal conditioner comprises a footswitch detection circuit to determine whether the connected footswitch is the power level control footswitch by sensing for the potentiometer; and
an automatic switch to automatically switch to the power level control footswitch for a power level input to the drive signal conditioner when the potentiometer is detected, and to automatically switch to a front panel power level controller for the power level input to the drive signal conditioner when the potentiometer is not detected.

8. The ultrasonic dental scaling system of claim 1, further comprising:
a footswitch selected from an on/off footswitch or a power level control footswitch; and
a footswitch cable connecting the selected footswitch to the universal ultrasonic generation unit, wherein the footswitch cable comprises a passive activation plug corresponding to the connected on/off or power level control footswitch, wherein the passive activation plug corresponding to the on/off footswitch activates a power level controller in the ultrasonic generator unit when the on/off footswitch is connected, and wherein the passive activation plug corresponding to the power level control footswitch activates a power level controller in the footswitch when the power level control footswitch is connected.

9. The ultrasonic dental scaling system of claim 1, wherein the universal ultrasonic generator unit further comprises:
a common control module to change operating characteristics of either one of the activated piezoelectric and magnetostrictive operating modes of the drive signal conditioner; and
a common display module to display operating parameters of either one of the activated piezoelectric and magnetostrictive operating modes of the drive signal conditioner.

10. The ultrasonic dental scaling system of claim 1 further comprising an inventory of the ultrasonic devices including one or more of the piezoelectric ultrasonic devices and one or more of the magnetostrictive ultrasonic devices.

11. An assembly line system for assembling ultrasonic dental scaling units, comprising:
an inventory of ultrasonic devices comprising piezoelectric power scalers operable by capacitance and magnetostrictive power scalers operable by induction;
an inventory of device cables adapted to connect the ultrasonic devices to a respective universal ultrasonic generator unit;
an inventory of the universal ultrasonic generator units, wherein each ultrasonic generator unit comprises:
a signal conditioner comprising a piezoelectric mode circuit to drive one of the piezoelectric ultrasonic devices and further comprising a magnetostrictive mode circuit to drive one of the magnetostrictive ultrasonic devices;
the signal conditioner further comprising a switch to selectively activate the piezoelectric mode circuit and de-activate the magnetostrictive mode circuit when one of the piezoelectric power scalers is connected, or activate the magnetostrictive mode circuit and de-activate the piezoelectric mode circuit when one of the magnetostrictive power scalers is connected; and
a signal generation circuit to send an interrogation signal to the connected ultrasonic device and detect a response;
wherein the switch comprises a relay switch to automatically activate the piezoelectric or magnetostrictive mode circuit and de-activate the other of the magnetostrictive or piezoelectric mode circuit based on the response of the connected ultrasonic device to the interrogation signal; and
an assembly line workstation to assemble together a respective one or more of the device cables from the device cable inventory, a respective one or more of the power scalers from the ultrasonic device inventory, and a respective one of the universal ultrasonic generator units from the universal ultrasonic generator inventory to form assembled ultrasonic dental scaling units.

12. The system of claim 11, further comprising packaging to receive each of the assembled ultrasonic dental scaling units.

13. The system of claim 11, wherein the assembled ultrasonic units comprise the device cable attached to a respective one of the power scalers, or both of the power scaler and the universal ultrasonic generator unit and the ultrasonic device.

14. The system of claim 11, further comprising an inventory of footswitches comprising on/off footswitches and power level control footswitches, wherein the assembled ultrasonic units further comprise one or more of the footswitches from the footswitch inventory.

15. The assembly line system of claim 11 wherein the switch is automatic to automatically activate the piezoelectric mode circuit when one of the piezoelectric power scalers is connected the signal conditioner and to automatically activate the magnetostrictive mode circuit when one of the magnetostrictive ultrasonic power scalers is connected to the signal conditioner.

16. An ultrasonic dental scaling method, comprising:
connecting a device cable between a signal conditioner of a universal ultrasonic generator unit and an ultrasonic device comprising a power scaler handpiece and a tip, wherein the ultrasonic device is selected from a piezoelectric ultrasonic device operable on capacitance and a magnetostrictive ultrasonic device operable on inductance, wherein the signal conditioner comprises a piezoelectric mode circuit to drive the piezoelectric ultrasonic device when connected to the universal ultrasonic generator and further comprising a magnetostrictive mode circuit to drive the magnetostrictive ultrasonic device when connected to the universal ultrasonic generator, wherein the generator unit further comprises a signal generation circuit to send an interrogation signal to the connected ultrasonic device and detect a response;
wherein a switch in the signal generator comprises a relay switch to automatically activate the piezoelectric or magnetostrictive mode circuit and de-activate the other of the magnetostrictive or piezoelectric mode circuit based on the response of the connected ultrasonic device to the interrogation signal;
connecting a power source to the universal ultrasonic generator unit;
actuating the switch to selectively activate the piezoelectric mode circuit and de-activate the magnetostrictive mode circuit when the piezoelectric ultrasonic device is connected, or to selectively activate the magnetostrictive mode circuit and de-activate the piezoelectric mode circuit when the magnetostrictive ultrasonic device is connected; and
sensing for capacitance or induction in the connected ultrasonic device;
wherein the actuation of the switch is automatic based on the sensed capacitance or inductance.

17. The ultrasonic method of claim 16, wherein the device cable is universal to connect to either one of the piezoelectric and magnetostrictive ultrasonic devices.

18. The ultrasonic method of claim 16, further comprising:
connecting a footswitch cable between the signal conditioner of the universal ultrasonic generator unit and a footswitch selected from an on/off footswitch and a power level control footswitch, wherein the universal ultrasonic generator comprises a front panel power level controller for providing a power level input to the signal conditioner;
sensing for a potentiometer in the connected footswitch to determine if the footswitch is the on/off footswitch or the power level control footswitch; and
selectively switching to the power level control footswitch for the power level input to the drive signal conditioner when the potentiometer is detected, and to the front panel power level controller for the or the power level input to the drive signal conditioner when the potentiometer is not detected.

19. The ultrasonic method of claim 16, further comprising:
changing operating characteristics of either one of the activated piezoelectric and magnetostrictive operating modes of the drive signal conditioner using a common control module for the operating mode circuits; and
displaying operating parameters of either one of the activated piezoelectric and magnetostrictive operating mode circuits of the drive signal conditioner on a common display module.

20. The ultrasonic method of claim 16, further comprising:
selecting one of the ultrasonic devices for connection to the device cable from an inventory comprising the piezoelectric ultrasonic devices, the magnetostrictive ultrasonic devices, or a combination thereof;
selecting one of the device cables for connection to the selected ultrasonic device from an inventory of the device cables;
selecting one of the universal ultrasonic generator units for connection to the selected device cable from an inventory of the universal ultrasonic generator units; and
assembling together the selected ultrasonic device, the selected device cable, and the selected universal ultrasonic generator unit to form an assembled ultrasonic unit.

21. The ultrasonic method of claim 20, wherein the assembling together comprises attaching the selected device cable to the selected ultrasonic device, or to both of the selected ultrasonic device and the selected ultrasonic generator unit.

22. The ultrasonic method of claim 20, further comprising selecting a footswitch from an inventory of footswitches comprising on/off footswitches, power level control footswitches, or a combination thereof, and assembling together the selected footswitch, the selected ultrasonic device, the selected device cable, and the selected universal ultrasonic generator unit to form the assembled ultrasonic unit.

* * * * *

UNITED STATES PATENT AND TRADEMARK OFFICE
CERTIFICATE OF CORRECTION

PATENT NO. : 11,497,582 B2
APPLICATION NO. : 15/164678
DATED : November 15, 2022
INVENTOR(S) : James Feine It is certified that error appears in the above-identified patent and that said Letters Patent is hereby corrected as shown below:

On the Title Page

On Page 2, Item (56), in Column 1, under "Other Publications", Line 2, delete "RDM" and insert -- RDH --, therefor.

In the Specification

In Column 17, Line 22, delete "tin" and insert -- in --, therefor.

In the Claims

In Column 18, in Claim 1, Line 3, delete "generator; and" and insert -- generator; --, therefor.

In Column 19, in Claim 10, Line 15, delete "claim 1" and insert -- claim 1, --, therefor.

In Column 19, in Claim 12, Line 58, delete "system" and insert -- assembly line system --, therefor.

In Column 19, in Claim 13, Line 61, delete "system" and insert -- assembly line system --, therefor.

In Column 19, in Claim 14, Line 66, delete "system" and insert -- assembly line system --, therefor.

In Column 20, in Claim 15, Line 4, delete "claim 11" and insert -- claim 11, --, therefor.

In Column 20, in Claim 15, Line 7, delete "connected" and insert -- connected to --, therefor.

Signed and Sealed this
Seventh Day of February, 2023

Katherine Kelly Vidal
*Director of the United States Patent and Trademark Office*